US009086568B2

(12) United States Patent
Jarvenpaa

(10) Patent No.: US 9,086,568 B2
(45) Date of Patent: Jul. 21, 2015

(54) METHOD AND APPARATUS FOR VIEW RECOVERY

(71) Applicant: Nokia Corporation, Espoo (FI)

(72) Inventor: Toni Johan Jarvenpaa, Akaa (FI)

(73) Assignee: Nokia Technologies Oy, Espoo (FI)

( * ) Notice: Subject to any disclaimer, the term of this patent is extended or adjusted under 35 U.S.C. 154(b) by 136 days.

(21) Appl. No.: 13/865,422

(22) Filed: Apr. 18, 2013

(65) Prior Publication Data

US 2014/0313585 A1    Oct. 23, 2014

(51) Int. Cl.
*G02B 27/14* (2006.01)
*G02B 27/01* (2006.01)
*G02B 5/18* (2006.01)
*G02B 6/00* (2006.01)

(52) U.S. Cl.
CPC .............. *G02B 27/0172* (2013.01); *G02B 5/18* (2013.01); *G02B 6/00* (2013.01); *G02B 2027/0125* (2013.01); *G02B 2027/0178* (2013.01)

(58) Field of Classification Search
USPC .................................................. 359/630–635
See application file for complete search history.

(56) References Cited

U.S. PATENT DOCUMENTS

| 7,764,413 B2 | 7/2010 | Levola ............................. 359/15 |
| 7,997,723 B2 | 8/2011 | Pienimaa et al. ............. 351/158 |
| 8,092,011 B2 | 1/2012 | Sugihara et al. .............. 351/158 |
| 8,160,411 B2 | 4/2012 | Levola et al. ................... 385/37 |
| 8,254,031 B2 | 8/2012 | Levola ........................... 359/634 |
| 8,467,133 B2 * | 6/2013 | Miller ............................ 359/630 |
| 8,752,963 B2 * | 6/2014 | McCulloch et al. .......... 351/209 |
| 2010/0231693 A1 | 9/2010 | Levola ............................. 348/51 |
| 2010/0321409 A1 | 12/2010 | Komori et al. ................ 345/656 |
| 2012/0212484 A1 * | 8/2012 | Haddick et al. ............... 345/419 |

FOREIGN PATENT DOCUMENTS

| EP | 1 566-682 A1 | 8/2005 |
| EP | 2 378 346 A1 | 10/2011 |
| WO | WO-2006/064301 A1 | 6/2006 |
| WO | WO-2008/046075 A2 | 4/2008 |
| WO | WO-2012/093351 A1 | 7/2012 |

OTHER PUBLICATIONS

"Head-Worn Displays: The Future Through New Eyes", Jannick Rolland, et al., Optics & Photonics News, Dec. 31, 2012, 6 pgs.
"NRC at the International Symposium on Mixed and Augmented Reality (ISMAR)", http://research.nokia.com/news/54701; Oct. 19, 2019, 1 pg.

(Continued)

*Primary Examiner* — Mohammed Hasan
(74) *Attorney, Agent, or Firm* — Harrington & Smith

(57) ABSTRACT

In accordance with an example embodiment of the present invention, an apparatus is disclosed. The apparatus includes a member, an optical engine, and a light guide. The member is configured to be placed proximate a face of a user. The optical engine is connected to the member. The optical engine is configured to provide an image viewable by the user. The light guide is connected to the member. The light guide includes an output section and an input section. The light guide is configured to transfer an image corresponding to a visual field of the user blocked by a substantially opaque portion of the apparatus.

20 Claims, 4 Drawing Sheets

(56) References Cited

OTHER PUBLICATIONS

"Mobile Mixed Reality", Nokia Technology Insights series, Nokia Research Center, http://research.nokia.com/files/NTI_MARA_-_June_2009.pdf, Jun. 2009, 4 pgs.
Enjoying Visual Content Anytime, Anywhere: The Moverio BT-100 Mobile Viewer, http://global.epson.com/newsroom/2001/news_20111219.html, Dec. 19, 2011, 3 pgs.
Sony Entertainment Access Glasses (STW-C140G1), http://pro.sony.com/bbsccms/assets/files/mkt/digicinema/brochures/EntAccessGlasses-DI-0272_2.pdf, Apr. 2012, 4 pgs.
Vuzix Secures License to See-Through Optics Technology from Nokia, http://vuzix.com/site/_news/2011_News/Vuzix-Secures-License-to-See-Through-Optics-Technology-from-Nokia.pdf, Oct. 21, 2011, 2 pgs.

* cited by examiner

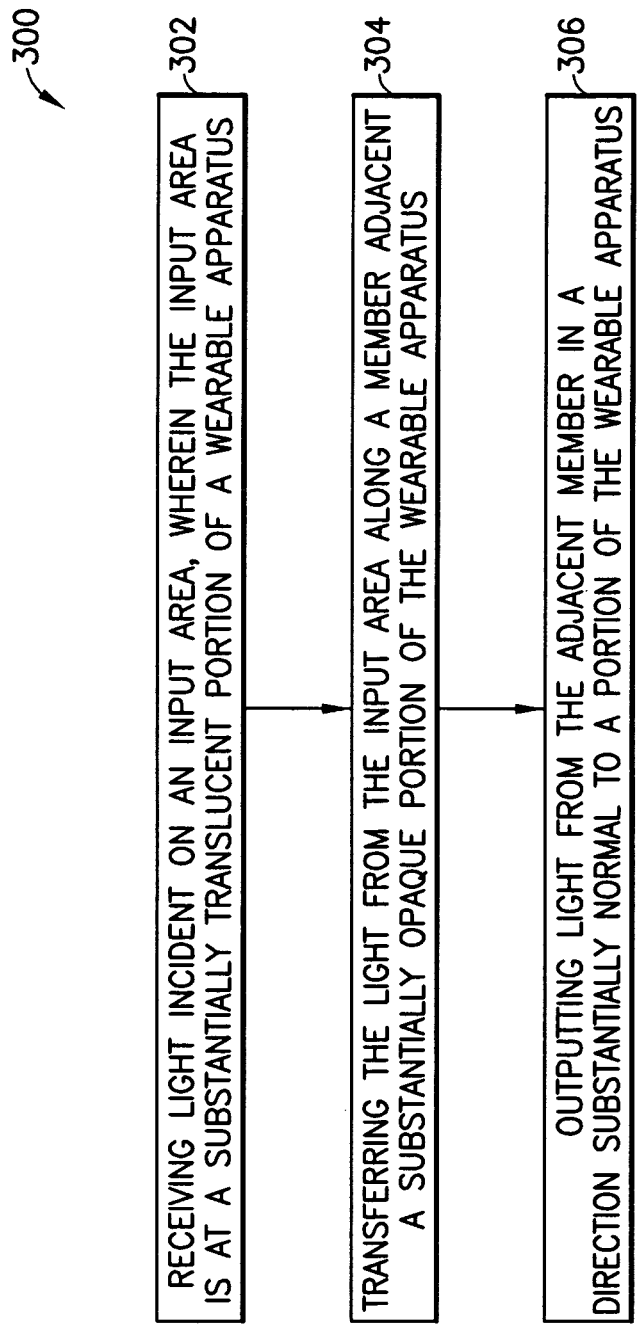

METHOD AND APPARATUS FOR VIEW RECOVERY

TECHNICAL FIELD

The invention relates to view recovery and, more particularly, to an apparatus which has near-eye displays and providing light guides to recover views.

BACKGROUND

As electronic devices continue to become more sophisticated, these devices provide an increasing amount of functionality and features, for example some devices connect to near-eye displays (NEDs) to enhance the user experience. Additionally, many conventional NEDs have not been transparent, but nowadays many companies are working on light guides that can enable see-through NED. Furthermore, increasing transparency has typically been made by using larger light guides and possibly transparent windows in positions where such can be placed.

As consumers demand increased functionality from electronic devices, there is a need to provide improvements for having increased capabilities while maintaining robust and reliable product configurations.

SUMMARY

Various aspects of examples of the invention are set out in the claims.

According to a first aspect of the present invention, an apparatus is disclosed. The apparatus includes a member, an optical engine, and a light guide. The member is configured to be placed proximate a face of a user. The optical engine is connected to the member. The optical engine is configured to provide an image viewable by the user. The light guide is connected to the member. The light guide includes an output section and an input section. The light guide is configured to transfer an image corresponding to a visual field of the user blocked by a substantially opaque portion of the apparatus.

According to a second aspect of the present invention, a method is disclosed. Light incident on an input area is received. The input area is at a substantially translucent portion of a wearable apparatus. The light is transferred from the input area along a member adjacent a substantially opaque portion of the wearable apparatus. Light is outputted from the adjacent member in a direction substantially normal to a portion of the wearable apparatus.

According to a third aspect of the present invention, a method is disclosed. A member configured to be placed proximate a face of a user is provided. An optical engine is connected to the member. The optical engine is configured to provide an image viewable by the user. A light guide connected to the member is provided. The light guide includes an output section and an input section. The light guide is configured to transfer an image corresponding to a visual field of the user blocked by a substantially opaque portion of the apparatus.

BRIEF DESCRIPTION OF THE DRAWINGS

For a more complete understanding of example embodiments of the present invention, reference is now made to the following descriptions taken in connection with the accompanying drawings in which:

FIG. 4 is a block diagram of an exemplary method of the apparatus' shown in FIGS. 1-3.

DETAILED DESCRIPTION OF THE DRAWINGS

An example embodiment of the present invention and its potential advantages are understood by referring to FIGS. 1 through 4 of the drawings.

Figure 1:
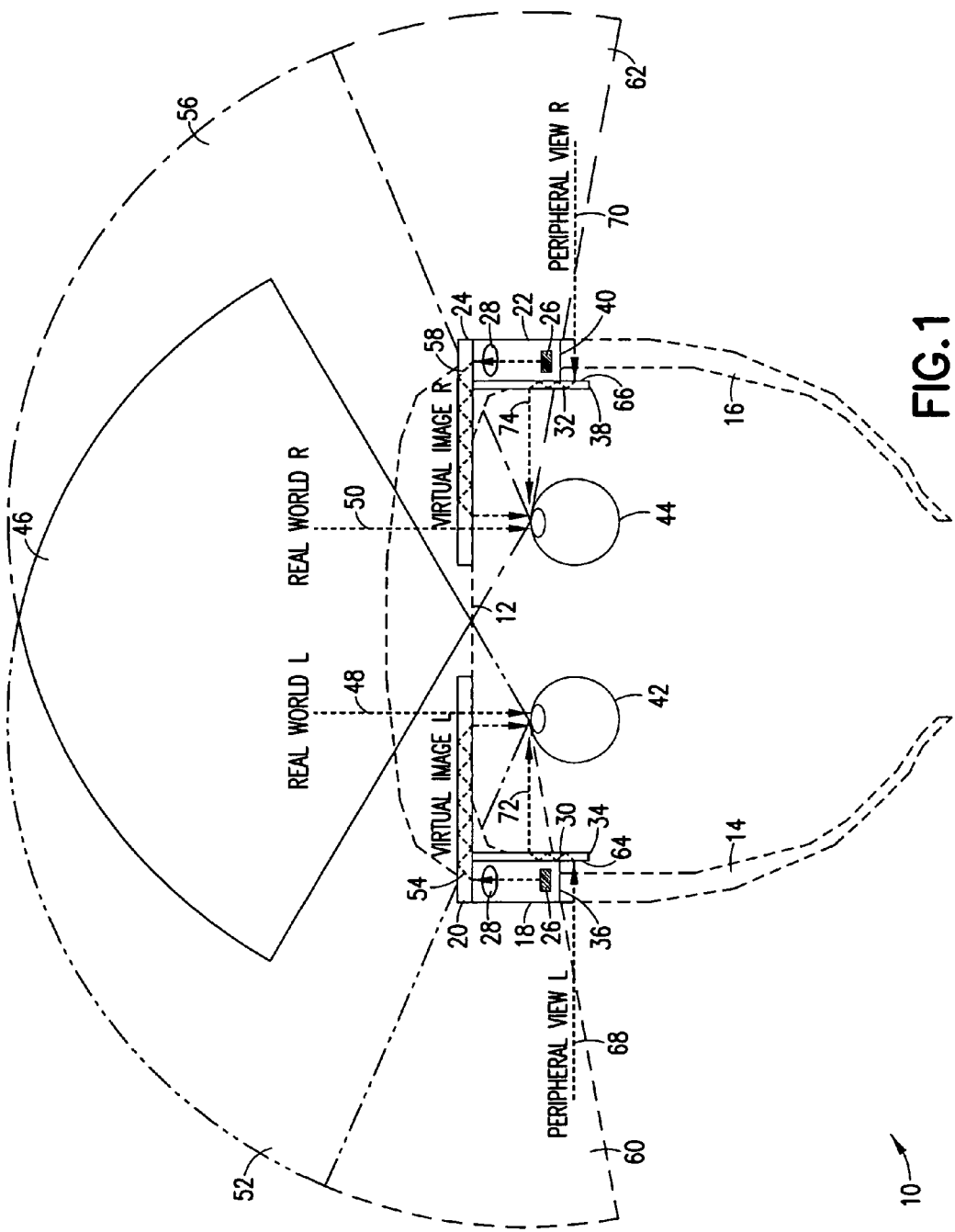
FIG. 1 is a top view of an apparatus incorporating features of the invention.

Referring to FIG. 1, there is shown a top view of an apparatus 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the apparatus 10 comprises Augmented Reality (AR) goggles/glasses. However, in alternate embodiments, features of the various embodiments of the invention could be used in any suitable type of wearable device worn by a user proximate the head/face area, such as a head mounted display, smart glasses, near-eye displays (NED), virtual reality eyewear, or wearable "action" camera and skiing goggles, for example.

The apparatus 10 generally comprises a front frame portion 12, a left side arm portion 14, and a right side arm portion 16. The apparatus further comprises a left optical engine 18, a left light guide 20, a right optical engine 22, and a right light guide 24. The left optical engine 18 and the right optical engine 22 each comprise a display 26 and optics 28. According to various exemplary embodiments of the invention, the display may comprise a micro-display and the optics may comprise a lens arrangement, however in alternate embodiments, any suitable type of optical engine and/or any suitable type of display and optics, may be provided.

The light guides 20, 24 generally comprise diffractive exit-pupil expanders (EPEs). According to various exemplary embodiments of the invention, the diffractive exit-pupil expanders are substantially transparent exit-pupil expanders (EPE), wherein the near-eye displays utilize the exit-pupil expanders (EPE) as transparent light guides. However in alternate embodiments, any suitable type of light guides or optical arrangement may be provided.

The apparatus 10 further comprises a left peripheral light guide 30, and a right peripheral light guide 32. Similar to the light guides 20, 24, the light guides 30, 32 generally comprise diffractive exit-pupil expanders (EPEs). According to various exemplary embodiments of the invention, the diffractive exit-pupil expanders are substantially transparent exit-pupil expanders (EPE). However in alternate embodiments, any suitable type of light guides may be provided.

According to various exemplary embodiments, the light guide 30 is suitably disposed adjacent the optical engine 18 such that an end 34 of the light guide 30 extends beyond an end 36 of the optical engine 18. Similarly, the light guide 32 is suitably disposed adjacent the optical engine 22 such that an end 38 of the light guide 32 extends beyond an end 40 of the optical engine 22. However, in alternate embodiments, any suitable location for the light guides 30, 32, may be provided.

As shown in FIG. 1, a user's eyes 42, 44, generally can view a portion of the (binocular) visual field. For example, the 'Real world left' and 'Real world Right' (represented by area 46) are viewed by the user's eyes 42, 44 generally by paths 48, 50.

According to various exemplary embodiments of the inventions, the near-eye display is configured to use transparent EPE light guides for 'see-through' functionality, wherein virtual images can be superimposed in reality enabling augmented reality (AR) applications. For example, shown in FIG. 1, the left optical engine 18 provides 'virtual image Left' 52 that is in-coupled into one end of the left light guide 20, and wherein the light beams are then out-coupled at another end of the left light guide 20 and directed towards the user's left eye 42 (see path 54). Similarly, the right optical engine 22 provides a 'virtual image Right' 56 that is in-coupled into one end of the right light guide 24, and wherein the light beams are then out-coupled at another end of the right light guide 24 and directed towards the user's right eye 44 (see path 58).

According to various exemplary embodiments of the invention, the light guides 30, 32 can be placed in positions where visual field is blocked by opaque (or substantially opaque) parts of the NED. The lights guides 30, 32 are configured to work like a periscope and pass light "through" the opaque parts of the apparatus. According to various exemplary embodiments, the light guide 30, 32 operation can be similar to the light guides 20, 24, meaning input, expansion and output area (e.g. diffractive gratings).

As shown in FIG. 1, the light guides 30, 32 are placed in front of the optical engines 18, 22 on the left and right sides. Environmental light 60, 62 hitting the input area 64, 66 of the light guides 30, 32 in a non-opaque part is in-coupled to the light guide 30, 32 (see path 68, 70). According to various exemplary embodiments of the invention, the input area 64, 66 position can be freely designed (over/under/behind the optical engine 18, 22), but should generally be as close as possible to the natural light path to avoid large perspective errors. After horizontal and vertical expansion, the light beams get out-coupled from the plate towards the eyes 42, 44 (see path 72, 74). The user/viewer will generally observe a slightly dimmer and possibly unfocused image in his/her peripheral view. Nonetheless in a normal way, after detecting changes/motion he/she can easily alter the head pose towards the observed event. Field-of-view of the transmitted image can be at least 50 degrees diagonal with simple light guide structures. Additionally, in alternate embodiments more could be achieved with more complicated arrangements (such as those having multiple inputs or additional optical elements, for example).

Figure 2:
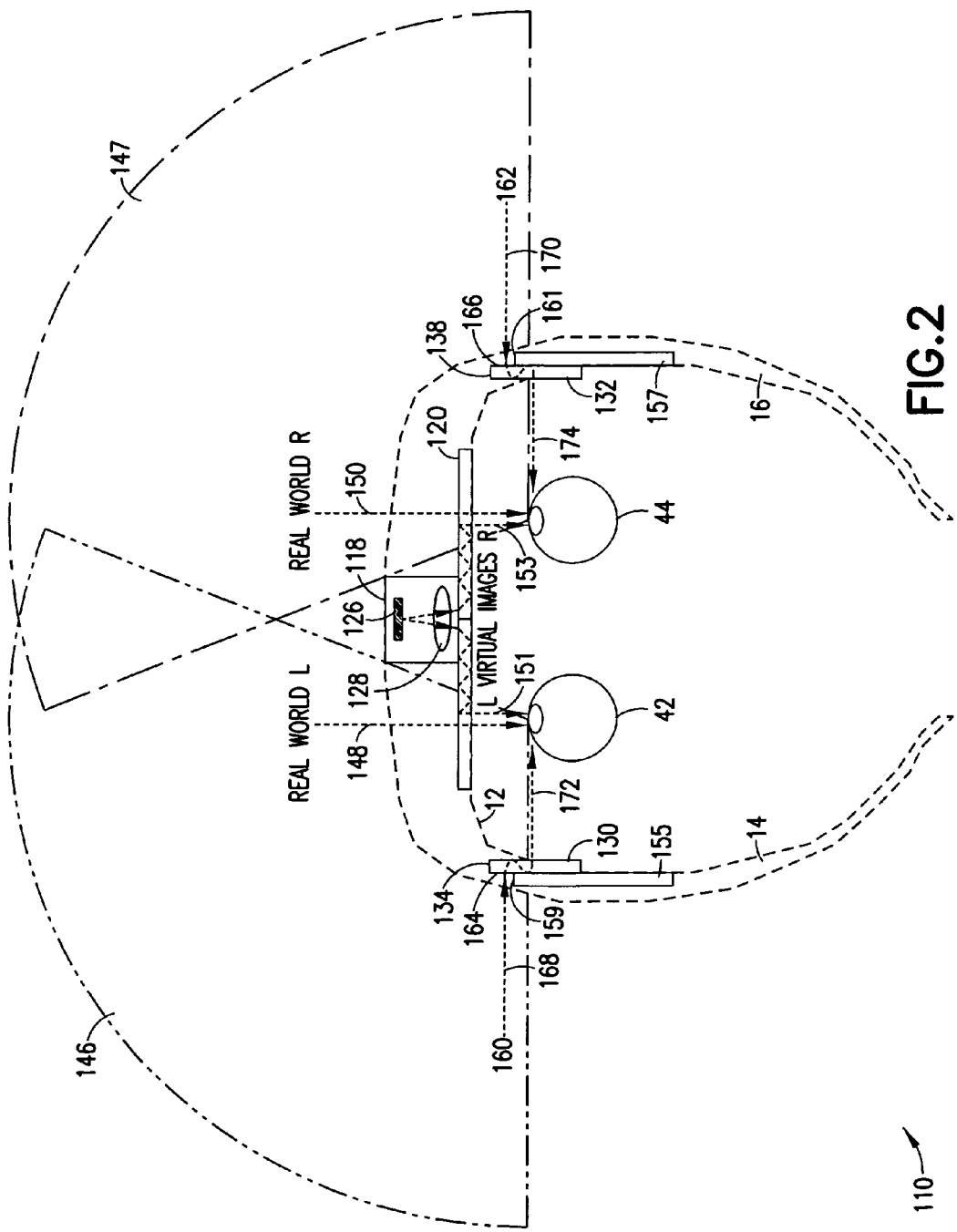
FIG. 2 is a top view of another embodiment of an apparatus incorporating features of the invention.

Referring now also to FIG. 2 another exemplary embodiment of the invention is shown. In this embodiment the apparatus 110 comprises a near-eye display with center-illumination. For example, in this embodiment, the apparatus 110 comprises an optical engine 118 (having a display 126 and optics 128) and a light guide 120 proximate a central area of the front frame portion 12. As shown in FIG. 2, the user's eyes 42, 44, generally can view a portion of the (binocular) visual field (as the optical engine blocks a portion of the binocular visual field). For example, the 'Real world left' and 'Real world Right' (represented by areas 146, 147) are viewed by the user's eyes 42, 44 generally by paths 148, 150. Additionally, the light guide 120 provides virtual left and right images to the user's eyes 42, 44 (see paths 151, 153).

The apparatus 110 further comprises additional elements 155, 157 (which may be printed circuit boards [PCBs], for example) that can block at least a portion of the peripheral view. Similar to the light guides 30, 32, of the apparatus 10, light guides 130, 132 can be placed in positions where visual field is blocked. The lights guides 130, 132 are configured to work like a periscope and pass light "through" the opaque parts of the apparatus.

According to various exemplary embodiments, the light guide 130 is suitably disposed adjacent the element 155 such that an end 134 of the light guide 130 extends beyond an end 159 of the element 155. Similarly, the light guide 132 is suitably disposed adjacent the element 157 such that an end 138 of the light guide 132 extends beyond an end 161 of the element 157. However, in alternate embodiments, any suitable location for the light guides 130, 132, may be provided.

As shown in FIG. 2, the light guides 130, 132 are placed on the left and right sides such that environmental light 160, 162 hitting the input area 164, 166 of the light guides 130, 132 in a non-opaque part is in-coupled to the light guide 130, 132 (see path 168, 170). According to various exemplary embodiments of the invention, the input area 164, 166 position can be freely designed (over/under/behind the element 155, 157), but should generally be as close as possible to the natural light path to avoid large perspective errors. After horizontal and vertical expansion, the light beams get out-coupled from the plate towards the eyes 42, 44 (see path 172, 174). The user/viewer will generally observe a slightly dimmer and possibly unfocused image in his/her peripheral view. Nonetheless in a normal way, after detecting changes/motion he/she can easily alter the head pose towards the observed event.

Additionally, it should be understood that the various exemplary embodiments described above are provided as non-limiting examples, and any suitable configuration for the lights guides 30, 32, 130, 132 may be provided to be used with center-illuminated AR goggles and/or conventional NEDs which fully block the view of the user/viewer.

Figure 3:
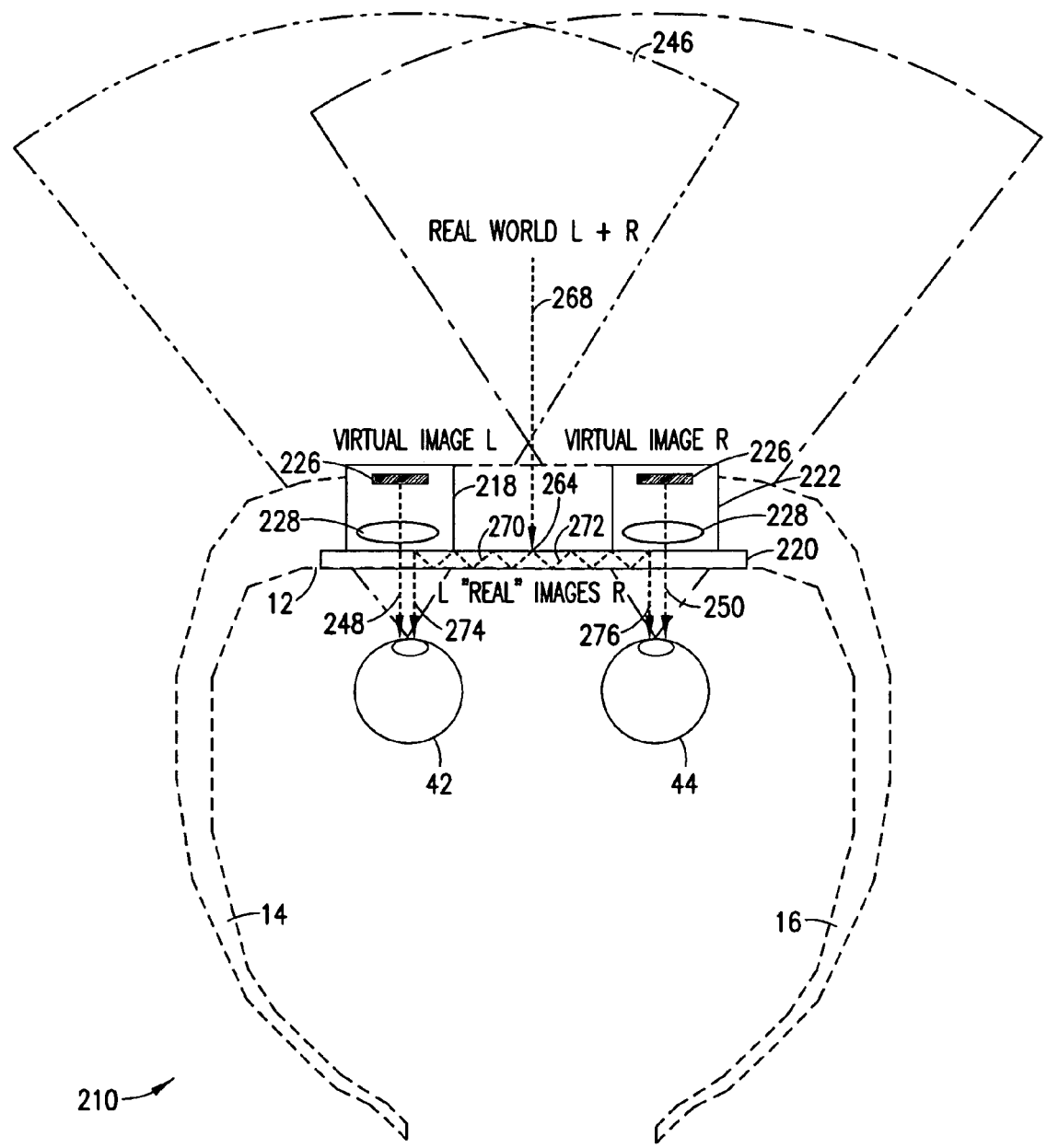
FIG. 3 is a top view of yet another embodiment of an apparatus incorporating features of the invention.

For example, referring now also to FIG. 3 another exemplary embodiment of the invention is shown. In this embodiment the apparatus 210 comprises a near-eye display with a 'reality' overlay. In this example embodiment, the apparatus 110 comprises optical engines 218, 222 (each having a display 226 and optics 228) and a light guide 220 proximate a central area of the front frame portion 12. As shown in FIG. 3, the user's eyes 42, 44, generally cannot view the (binocular) visual field (as the optical engines fully block the binocular visual field).

In this embodiment, the light guide 220 can be placed in a position where the visual field is blocked. According to various exemplary embodiments, the light guide 220 is suitably disposed adjacent the optical engines 218, 222, such that the light guide 220 is between the optical engines 218, 222 and the user's eyes 42, 44. Additionally, the light guide 220 extends between the optical engines 218, 222 such that a center portion of the light guide 220 is not blocked by the optical engines 218, 222.

As shown in FIG. 3, the optical engines 218, 222 provide a 'virtual image left' and a 'virtual image right' to the user's eyes 42, 44 (through the light guide 220, see path 248, 250). Additionally, the light guide 220 is configured such that the real world left and right light 246 is received by the input area 264 of the light guide 220 in a non-opaque part and is in-coupled to the light guide 220 (see paths 268, 270, 272). According to various exemplary embodiments of the invention, the input area 264 position can be freely designed such that it is substantially aligned with a non-opaque area of the apparatus between the optical engines 218, 222. After horizontal and vertical expansion, the light beams get out-coupled from the plates towards the eyes 42, 44 (see paths 274, 276). This generally provides for an approach to overlay the view of the reality "on top" of the virtual image.

It should be noted that, as shown various figures described above, the optical engine(s) is generally required for the display, however the input area(s) of the light guide can be used as such to in-couple light into the light guide. This generally provides for distant objects to be transmitted sharp while closer objects get blurred. This is however generally not a problem, as the peripheral vision is generally more sensitive to detecting motion than to accuracy. In addition, suitable optical elements could be added to alter the focus distance of the in-coupled light.

According to various exemplary embodiments of the invention, the apparatus 10, 110, 210 may be a stand alone device, or may be connected to an electronic device by any suitable type of wired or wireless data communication. For example, the apparatus 10, 110, 210, may be configured to be connected to any suitable type of electronic device such as a mobile phone, a gaming device, a music player, a notebook computer, or a personal digital assistant, for example. In addition, as is known in the art, the electronic device could include multiple features or applications such as a camera, a music player, a game player, or an Internet browser, for example, wherein the device generally comprises a transmitter, a receiver, an antenna (connected to the transmitter and the receiver), and electronic circuitry, such as a controller (which could include a processor, for example) and a memory for example.

FIG. 4 illustrates a method 300. The method 300 includes receiving light incident on an input area, wherein the input area is at a substantially translucent portion of a wearable apparatus (at block 302). Transferring the light from the input area along a member adjacent a substantially opaque portion of the wearable apparatus (at block 304). Outputting light from the adjacent member in a direction substantially normal to a portion of the wearable apparatus (at block 306). It should be noted that the illustration of a particular order of the blocks does not necessarily imply that there is a required or preferred order for the blocks and the order and arrangement of the blocks may be varied. Furthermore it may be possible for some blocks to be omitted.

Technical effects of any one or more of the exemplary embodiments provide for improved visibility when compared to conventional configurations. For example, many of the conventional devices, such as Augmented Reality (AR) goggles should be as transparent as possible but some building elements of the AR goggles can block a part of the visual (binocular) field. Additionally, in some conventional configurations having a center-illuminated approach, the optical engine is in front of the face and blocks part of the central vision. This is clearly not desirable as it, for example, may induce eye strain. Further in some other conventional configurations, the optical engines are on the sides, however, the problem with this approach is that the peripheral vision gets easily blocked, and especially for mobile applications this is a clear comfortability and safety issue.

Without in any way limiting the scope, interpretation, or application of the claims appearing below, a technical effect of one or more of the example embodiments disclosed herein is that the AR goggles are as transparent as possible, so the apparatus could be worn on all occasions. Another technical effect of one or more of the example embodiments disclosed herein is to provide light guides implemented to work as periscopes. Another technical effect of one or more of the example embodiments disclosed herein is that the outputs of the light guides are placed in positions where visual field is blocked by opaque parts of the NED, and were inputs of the light guides are placed in position where visual field is not blocked by opaque parts of the NED. Another technical effect of one or more of the example embodiments disclosed herein is that the visual field, that is behind of the opaque parts of the NED (blocked visual field), is transferred in the front of the opaque parts of the NED (via light guides). Another technical effect of one or more of the example embodiments disclosed herein is that the light guides that are used as 'periscopes', are transferring visual field behind of the building elements of the AR goggles.

Another technical effect of one or more of the example embodiments disclosed herein is to provide additional light guides to recover the peripheral view. Another technical effect of one or more of the example embodiments disclosed herein is to provide a simple path for NED developers to have real see-through capability and not a camera based as may be used. Another technical effect of one or more of the example embodiments disclosed herein is that the viewer can also see visual field that is blocked by the opaque parts of the NED, and a more natural view of the surroundings is provided while wearing the near-eye display. Another technical effect of one or more of the example embodiments disclosed herein is added safety, simple structure, cost effective and "real" (at least real-time) optical see-through for NEDs.

It should be noted that, according to various exemplary embodiments of the invention, improvements can be provided by certain optical arrangements (zoom lenses, mirrors, adjustments, shutters, additional notification LEDs/lasers, cameras, etc.

While various exemplary embodiments of the invention have been described in connection with opaque portions or opaque parts of the apparatus (or NED), one skilled in the art will appreciate that various exemplary embodiments of the invention are not necessarily so limited and that the opaque portions or opaque parts described above may comprise substantially opaque or partially opaque portions or parts of the apparatus (or NED).

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for mobile phone or a similar integrated circuit in server, a cellular network device, or other network device.

Below are provided further descriptions various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

A peripheral view recovery light guide for near-eye displays is disclosed wherein light guides (e.g. diffractive exit-pupil expanders (EPEs)) are placed in positions where visual field is blocked by opaque parts of the NED (near-eye displays). The transparent EPE light guide works like a periscope and passes light through the opaque parts resulting in a see-through functionality. Environmental light hitting the input area in a non-opaque part is in-coupled to the light guide. The input area position is as close as possible to the natural light path to avoid large perspective errors. After horizontal and vertical expansion, the light beams get out-coupled from the plate towards the eyes.

In one exemplary embodiment, an apparatus comprising a member configured to be placed proximate a face of a user, an optical engine connected to the member, wherein the optical engine is configured to provide an image viewable by the user, and a light guide connected to the member, wherein the light guide comprises an output section and an input section, and wherein the light guide is configured to transfer an image corresponding to a visual field of the user blocked by a substantially opaque portion of the apparatus.

An apparatus as above, wherein the member comprises a front frame portion or a side arm portion of a wearable apparatus.

An apparatus as above, wherein the light guide comprises a diffractive exit-pupil expander.

An apparatus as above, wherein the light guide comprises a substantially transparent light guide.

An apparatus as above, wherein the optical engine comprises a display and optics.

An apparatus as above, wherein the light guide is adjacent the optical engine.

An apparatus as above, wherein an end of the light guide extends beyond an end of the optical engine.

An apparatus as above, wherein the light guide comprises an input area at the end of the light guide.

An apparatus as above, wherein the light guide is configured to transfer the image corresponding to the visual field of the user blocked by the optical engine.

An apparatus as above, further comprising another different light guide configured to transfer another image corresponding to a visual field of the user blocked by another substantially opaque portion of the apparatus.

An apparatus as above, wherein the image corresponds to environmental light proximate a peripheral visual view field of the user.

An apparatus as above, wherein the apparatus comprises a near-eye display.

In another exemplary embodiment, a method, comprising receiving light incident on an input area, wherein the input area is at a substantially translucent portion of a wearable apparatus, transferring the light from the input area along a member adjacent a substantially opaque portion of the wearable apparatus, and outputting light from the adjacent member in a direction substantially normal to a portion of the wearable apparatus.

A method as above, wherein the transferring of the light further comprises transferring the light along a light guide, wherein the light guide is adjacent an optical engine of the wearable apparatus.

A method as above, wherein the input area comprises a portion of a transparent diffractive exit-pupil expander.

A method as above, wherein the wearable apparatus comprises a near-eye display.

In another exemplary embodiment, a method, comprising providing a member configured to be placed proximate a face of a user, connecting an optical engine to the member, wherein the optical engine is configured to provide an image viewable by the user, and providing a light guide connected to the member, wherein the light guide comprises an output section and an input section, and wherein the light guide is configured to transfer an image corresponding to a visual field of the user blocked by a substantially opaque portion of the apparatus.

A method as above, wherein the light guide comprises a substantially transparent diffractive exit-pupil expander.

A method as above, wherein the member comprises a front frame portion or a side arm portion of a near-eye display.

A method as above, wherein the image corresponds to environmental light proximate a peripheral visual view field of the user.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus, comprising:
    a member configured to be placed proximate a face of a user;
    an optical engine connected to the member, wherein the optical engine is configured to provide an image viewable by the user;
    a substantially opaque portion proximate the member, wherein the substantially opaque portion is configured to block a visual field of the user; and
    a light guide connected to the member, wherein the light guide comprises an output section and an input section, and wherein the light guide is configured to transfer the blocked visual field of the user that is blocked by the substantially opaque portion of the apparatus.

2. The apparatus of claim 1 wherein the member comprises a front frame portion or a side arm portion of a wearable apparatus.

3. The apparatus of claim 1 wherein the light guide comprises a diffractive exit-pupil expander.

4. The apparatus of claim 1 wherein the light guide comprises a substantially transparent light guide.

5. The apparatus of claim 1 wherein the optical engine comprises a display and optics.

6. The apparatus of claim 1 wherein the light guide is adjacent the optical engine.

7. The apparatus of claim 1 wherein an end of the light guide extends beyond an end of the optical engine.

8. The apparatus of claim 7 wherein the light guide comprises an input area at the end of the light guide.

9. The apparatus of claim 1 wherein the light guide is configured to provide the blocked visual field of the user.

10. The apparatus of claim 1 further comprising another different light guide configured to transfer another image corresponding to a visual field of the user blocked by another substantially opaque portion of the apparatus.

11. The apparatus of claim 1 wherein the image corresponds to environmental light proximate a peripheral visual view field of the user.

12. The apparatus of claim 1 wherein the apparatus comprises a near-eye display.

13. A method, comprising:
receiving light incident on an input area, wherein the input area is at a substantially translucent portion of a wearable apparatus;
transferring the light from the input area along a member adjacent a substantially opaque portion of the wearable apparatus, wherein the substantially opaque portion is configured to block a visual field of a user; and
outputting light from the adjacent member in a direction substantially normal to a portion of the wearable apparatus;
wherein the transferring of the light further comprises transferring the light along a light guide, wherein the light guide is configured to transfer the blocked visual field of the user that is blocked by the substantially opaque portion.

14. The method of claim 13 wherein the light guide is adjacent an optical engine of the wearable apparatus.

15. The method of claim 13 wherein the input area comprises a portion of a transparent diffractive exit-pupil expander.

16. The method of claim 13 wherein the wearable apparatus comprises a near-eye display.

17. A method, comprising:
providing a member configured to be placed proximate a face of a user;
connecting an optical engine to the member, wherein the optical engine is configured to provide an image viewable by the user;
providing a substantially opaque portion proximate the member, wherein the substantially opaque portion is configured to block a visual field of the user; and
providing a light guide connected to the member, wherein the light guide comprises an output section and an input section, and wherein the light guide is configured to transfer the blocked visual field of the user that is blocked by the substantially opaque portion of the apparatus.

18. The method of claim 17 wherein the light guide comprises a substantially transparent diffractive exit-pupil expander.

19. The method of claim 17 wherein the member comprises a front frame portion or a side arm portion of a near-eye display.

20. The method of claim 17 wherein the image corresponds to environmental light proximate a peripheral visual view field of the user.

* * * * *